(12) United States Patent
Semmer et al.

(10) Patent No.: US 8,182,613 B2
(45) Date of Patent: May 22, 2012

(54) RADIOMETER INCLUDING A CLEANING SYSTEM

(75) Inventors: Steven Semmer, Westminster, CO (US); David Richter, Stanford, CA (US); Steve Oncley, Boulder, CO (US); Anthony Delany, Eldorado Springs, CO (US); Karl T. Schwenz, Berthoud, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 305 days.

(21) Appl. No.: 12/534,967

(22) Filed: Aug. 4, 2009

(65) Prior Publication Data

US 2011/0030728 A1  Feb. 10, 2011

(51) Int. Cl.
*B08B 3/02* (2006.01)
*B08B 3/04* (2006.01)
*B08B 3/08* (2006.01)
*B08B 11/00* (2006.01)
*G01J 5/04* (2006.01)

(52) U.S. Cl. ......... 134/34; 134/42; 134/198; 250/338.1; 250/526; 356/51; 356/72

(58) Field of Classification Search ............... 134/34, 134/198, 115 R; 250/239, 338.1; 356/51, 356/72
See application file for complete search history.

(56) References Cited

U.S. PATENT DOCUMENTS

| 4,040,473 A * | 8/1977 | Wheeler ................... 165/5 |
| 4,383,572 A * | 5/1983 | Bellows ..................... 165/5 |
| 5,539,210 A * | 7/1996 | Maarschalkerweerd ...... 250/372 |
| 6,518,577 B1 * | 2/2003 | Fang et al. ................ 250/372 |
| 2004/0190281 A1 * | 9/2004 | Williams et al. ........... 362/100 |
| 2006/0247143 A1 * | 11/2006 | Gallagher et al. ......... 510/180 |

* cited by examiner

Primary Examiner — Michael Kornakov
Assistant Examiner — Natasha Campbell
(74) Attorney, Agent, or Firm — The Ollila Law Group LLC

(57) ABSTRACT

A radiometer is provided. The radiometer includes a sensor and a radiation transparent dome. The radiation transparent dome surrounds the sensor. The radiometer also includes one or more fluid nozzles. The one or more fluid nozzles are adapted to apply a fluid on the radiation transparent dome in order to clean the surface of the radiation transparent dome.

17 Claims, 3 Drawing Sheets

RADIOMETER INCLUDING A CLEANING SYSTEM

GOVERNMENT LICENSE RIGHTS

This invention was made with Government support under ATM-0301213 awarded by the National Science Foundation. The Government has certain rights in this invention.

TECHNICAL FIELD

The present invention is directed towards radiometers. More particularly, the present invention is directed towards a radiometer including a cleaning system.

BACKGROUND OF THE INVENTION

With the increasing concern of global climate changes, accurate solar radiation measuring instruments, such as radiometers, are becoming increasingly important. One problem currently faced when obtaining weather information is the buildup of dirt, debris, frost, rime ice, etc. that interferes with the instrument's sensing capabilities. Dirt and debris buildup often occurs on weather instruments regardless of their location. Rime often forms on the surface of weather instruments in extreme climates, such as in the Arctic; however, rime can be experienced in many other locations. Rime buildup can severely inhibit the measurement capabilities of many weather instruments, particularly radiometers. "Radiometer" as used in the present application is meant to include pyranometers and pyrgeometers as well as any other instrument capable of measuring solar radiation. Radiometers measure solar radiation flux from a field of view of approximately 180 degrees in a vertical plane and approximately 360° in a horizontal plane. A radiation transparent dome typically covers and protects the radiometer's sensor. Optically, the buildup of rime ice on the radiometer's dome can impede both shortwave and longwave radiation to the point where the readings of a rime covered radiometer cannot be distinguished from cloud coverage. Therefore, the information gathered by radiometers inhibited by rime or dirt typically results in inaccurate measurements.

There are several prior art approaches that attempt to address the problems associated with dirt and rime interfering with weather instruments, including radiometers. One approach has been to manually clean the instruments. An obvious problem with this approach is that the radiometer is required to be located at a manned weather station. This is often expensive and in some situations is not feasible. Furthermore, there is no way to keep the radiometer clean during periods between manual cleaning. Because of the severe limitations of this approach, manual cleaning is not an ideal solution.

Another prior art approach, particularly in colder environments where rime buildup is more of a concern than dirt, is the use of fans and/or heaters continuously blowing on the radiometer. It can easily be appreciated that this approach has the drawback of requiring substantial amounts of power. Generally, radiometers and other weather instruments positioned in extreme climates are designed to be self-powered, typically with solar powered batteries. As a result, the use of fans and heaters to keep rime from forming on the weather instrument consumes a substantial amount of power that may not be readily available. Consequently, this approach is generally only feasible where an AC-power source is available.

Therefore, there is a need in the art for a system capable of maintaining radiometers in an operational state by ensuring the sensor has a clean, substantially unobstructed view. The present invention overcomes this and other problems and an advance in the art is achieved.

SUMMARY OF THE INVENTION

According to an embodiment of the invention, a radiometer is provided. The radiometer includes a sensor and a radiation transparent dome surrounding the sensor. The radiometer also includes one or more fluid nozzles. The one or more fluid nozzles can be adapted to apply a fluid on the radiation transparent dome.

According to another embodiment of the invention, a cleaning system for a radiometer is provided. The cleaning system includes one or more fluid nozzles. The one or more fluid nozzles are adapted to apply a fluid on a radiation transparent dome of the radiometer. The cleaning system also includes one or more fluid conduits coupled to the one or more nozzles. The one or more fluid conduits are adapted to provide fluid communication between the one or more nozzles and a pressurized fluid source. The cleaning system also includes a coupling member including one or more apertures sized to receive the one or more nozzles and adapted to be coupled to a portion of the radiometer.

According to another embodiment of the invention, a method for cleaning a radiometer is provided. The radiometer includes a sensor and a radiation transparent dome surrounding the sensor. The method comprises the step of providing the radiation transparent dome with a fluid using one or more fluid nozzles coupled to the radiometer.

DETAILED DESCRIPTION OF THE INVENTION

Figure 1:
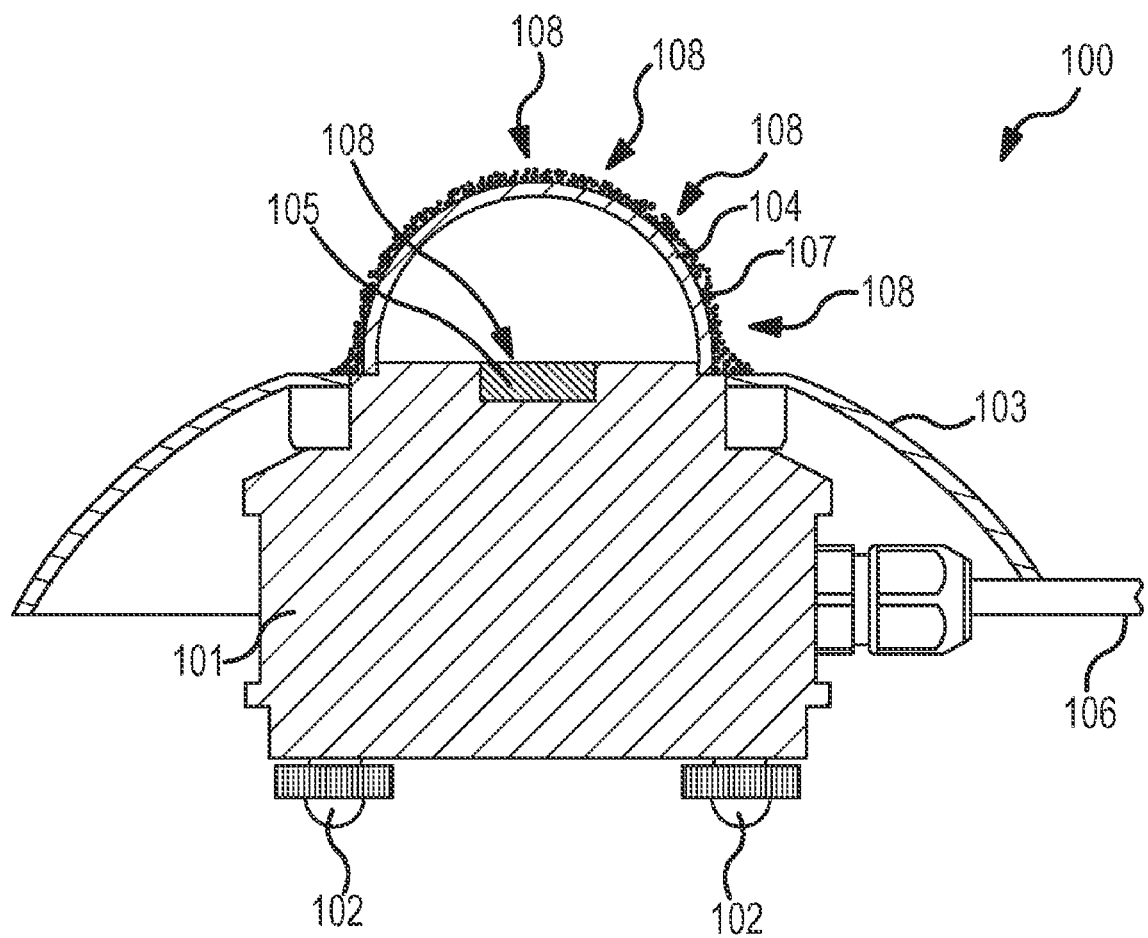
FIG. 1 shows a prior art radiometer.
Figure 2:
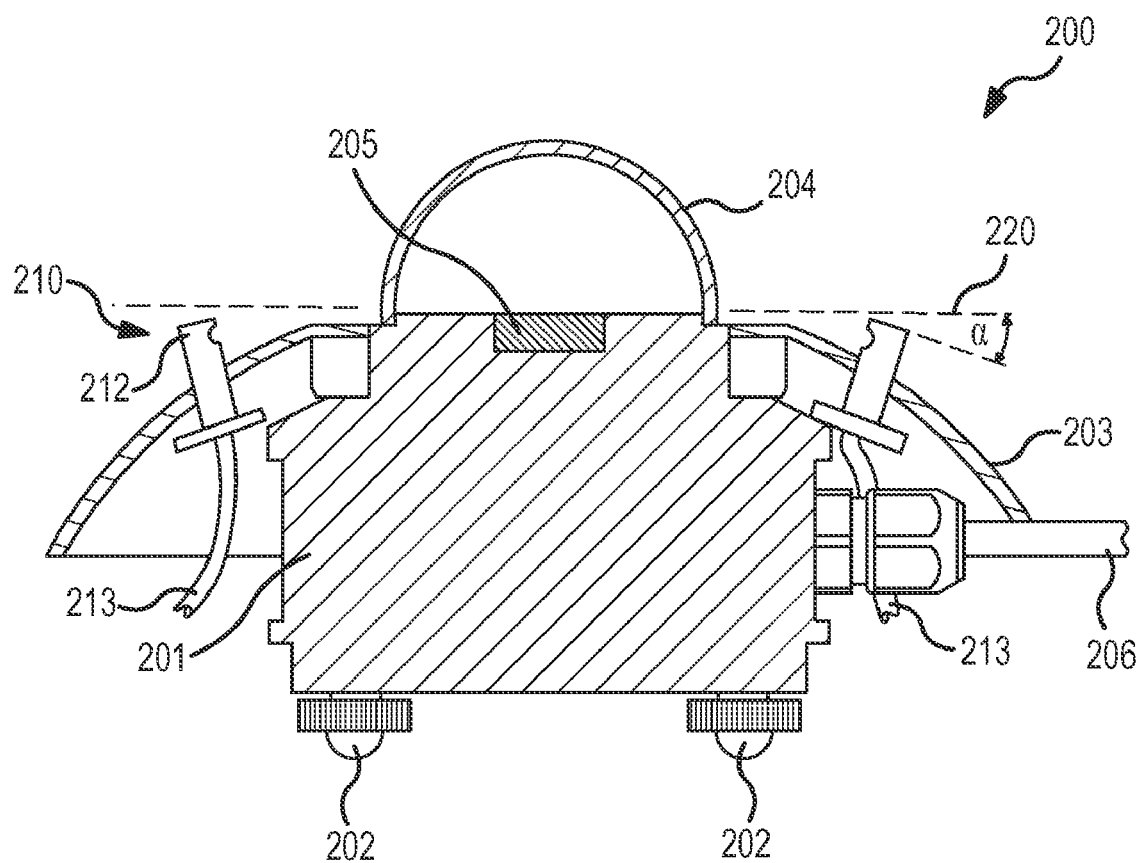
FIG. 2 shows a radiometer according to an embodiment of the invention.
Figure 3:
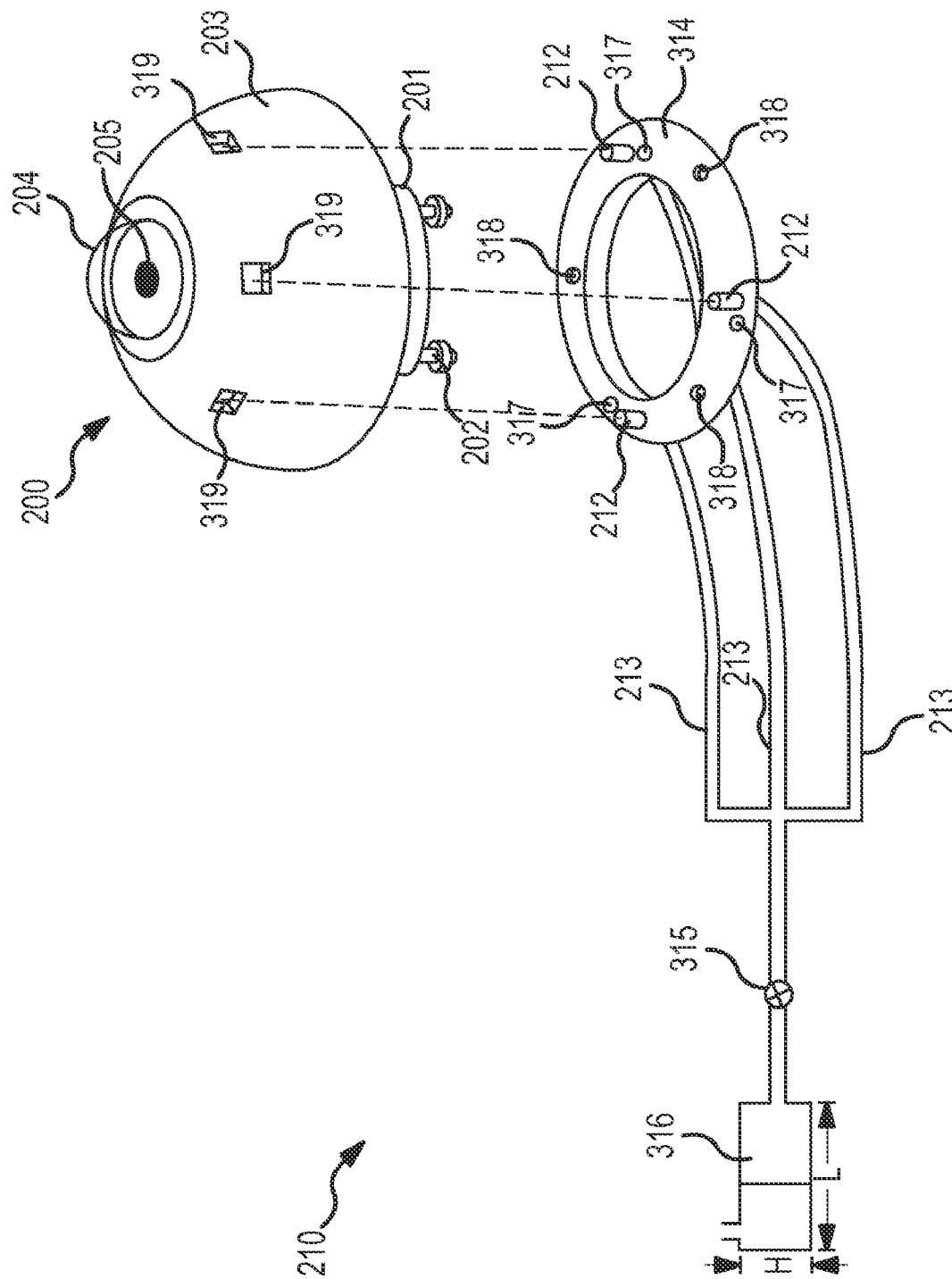
FIG. 3 shows the radiometer and a cleaning apparatus for the radiometer according to an embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a partial cross-sectional view of a prior art radiometer 100. The radiometer 100 includes a body 101, a plurality of leveling feet 102, a radiation shield 103, a radiation transparent dome 104, and a sensor 105. In addition, the radiometer 100 can include a data cable 106 to send/receive data signals to/from a computer or other processing device that is remote from the radiometer 100. Generally, the radiometer 100 does not require an external power source to operate; however, some radiometers may include a power source for a variety of reasons.

In use, the radiometer 100 can be used to measure a solar radiation flux density as is generally known in the art. Because of the radiation transparent dome 104, the radiometer 100 has essentially a 180 degree field of view. Solar radiation transmits through the transparent dome 104 and is detected by the sensor 105. The sensor 105 can generate a voltage output signal that is proportional to the solar radiation. This output signal can be sent to an external processing system using the data cable 106. The radiation shield 103 can be provided to reduce the heat loss of the sensor 105 due to convection. The measurement capabilities of radiometers are generally known in the art and therefore, a detailed discussion of the operation of radiometers is omitted.

Although the prior art radiometer 100 can provide accurate measurements when the dome 104 is substantially free from dirt, debris, rime, and other foreign matter that would interfere with the solar radiation reaching the sensor 105, the presence of such matter can severely limit the measurement capability and accuracy of the radiometer 100. With the dome 104 even partially covered, such as shown in FIG. 1 where the dome 104 is partially covered with a layer of rime ice 107, the measurements obtained by the radiometer 100 are often less useful. As shown in the figure, solar radiation 108 is unable to penetrate through the layer of rime 107 and therefore, only a portion of the total solar radiation 108 can reach the sensor 105. As discussed above, the accumulation of foreign matter is a serious problem, especially when the radiometer 100 is placed in remote unmanned locations. In such situations, cleaning the radiometer 100 manually is often not a feasible solution. Because of this problem, until now, there have been little or no accurate long-term measurements taken in extreme environments, such as the Arctic during the winter months as rime can quickly build on the dome 104 resulting in inaccurate data until the dome 104 could be manually cleaned.

FIG. 2 shows a partial cross-sectional view of a radiometer 200 according to an embodiment of the invention. According to the embodiment shown, the radiometer 200 comprises a body 201, adjustable legs 202, a radiation shield 203, a radiation transparent dome 204, a sensor 205, and a data cable 206. The body 201 can store and protect the radiometer's inner components, such as electric circuitry (not shown), for example. The radiation shield 203 can be provided for a number of reasons, such as to reduce the heat loss of the sensor 205 due to convection as described above. The sensor 205 may comprise a thermopile sensor, for example. The sensor 205 may include a black coating to absorb the solar radiation entering through the radiation transparent dome 204. The radiation transparent dome 204 may comprise quartz or some other solar radiation transparent material. The dome 204 may also be formed to limit the spectral responses transmitted to the sensor 205, while simultaneously preserving the approximately 180 degree field of view. The dome 204 may also be provided to protect the sensor 205 from foreign matter. The general measuring capabilities of the radiometer 200 is similar to the radiometer 100 of the prior art.

In addition to the components present in prior art radiometers, the radiometer 200 also includes a cleaning system 210. According to an embodiment of the invention, the cleaning system 210 can be provided to clean dirt, debris, and other foreign matter from the radiometer 200, and specifically, the dome 204. According to another embodiment of the invention, the cleaning system 210 may be provided as a de-icer to clean and dissolve rime ice, snow, etc. from the radiation transparent dome 204. As discussed above, such foreign matter can seriously interfere with the amount of solar radiation reaching the sensor 205 resulting in inaccurate measurements. According to an embodiment of the invention, a portion of the cleaning system 210 can be coupled to a portion of the radiometer 200. According to the embodiment shown, the cleaning system 210 can include one or more fluid nozzles 212. According to an embodiment of the invention, the one or more fluid nozzles 212 can be coupled to the radiometer 200.

In some embodiments, the one or more fluid nozzles 212 can be coupled to the radiation shield 203. The fluid nozzles 212 can be adapted to apply a fluid on the dome 204. According to an embodiment of the invention, the cleaning system 210 can also include one or more fluid conduits 213. The fluid conduits 213 can be adapted to deliver the fluid to the nozzles 212 from a pressurized fluid source (See FIG. 3). Although two fluid nozzles 212 and two fluid conduits 213 are shown, it should be appreciated that any number of nozzles 212 and corresponding fluid conduits 213 could be provided. Therefore, the particular number of nozzles 212 and fluid conduits 213 implemented should not limit the scope of the present invention. In some embodiments, the fluid conduits 213 can be omitted and the nozzles 212 can be pre-filled with the fluid or directly coupled to the pressurized fluid source.

The nozzle 212 may comprise any suitable nozzle and may comprise a commercially available nozzle, such as that used in an aerosol nozzle, a lawn sprinkler head, etc. Initial testing used a lawn sprinkler head manufactured by Raindrip®, part number R169C as the fluid nozzle 212. However, it can easily be appreciated that a variety of nozzles can be used and provide adequate cleaning results. Therefore, the particular nozzle 212 chosen should not limit the scope of the present invention. Ideally, the nozzle chosen can deliver fluid to the dome 204 with adequate coverage and retain adequate fluid momentum in order to clean and/or de-ice the dome 204. According to another embodiment of the invention, the nozzle 212 may be an opening that allows fluid to be applied to the desired surface under the force of gravity.

According to an embodiment of the invention, the fluid conduit 213 can be coupled to the nozzle 212 at a first end and coupled to a pressurized fluid source (See FIG. 3) at a second end in order to provide fluid communication between the nozzle 212 and the pressurized fluid source. The fluid conduit 213 may comprise a flexible conduit, such as a rubber or polyethylene hose, for example. Alternatively, the fluid conduit 213 may comprise a rigid pipe, such as a copper pipe, for example. The particular fluid conduit 213 used should not limit the scope of the present invention.

According to an embodiment of the invention, a portion of the cleaning system 210 can be coupled to the radiometer 200. According to the embodiment shown in FIG. 2, the cleaning system 210 is coupled to the radiation shield 203; however, the cleaning system 210 does not have to be coupled to the radiation shield 203. According to some embodiments, the radiometer 200 may not include a radiation shield 203 and therefore, the cleaning system 210 could be coupled to another portion of the radiometer 200, such as the body 201, for example.

According to an embodiment of the invention, the cleaning system 210, and more particularly, the nozzle 212 of the cleaning system 210 can be coupled to the radiation shield 203 and positioned such that the nozzle 212 does not inhibit the measurement capabilities of the radiometer 200. This can be ensured by positioning the nozzle 212 below the plane of view 220 of the sensor 205. As can be seen in FIG. 2, with the nozzles 212 positioned below the sensor's plane of view 220, the nozzles 212 do not interfere with the approximately 180 degree viewing angle of the sensor 205. With the nozzles 212 positioned below the plane 220, in some embodiment, the nozzles 212 can be angled away from the plane 220 by an angle α. By angling the nozzles 212, the fluid exiting the nozzles 212 can provide better fluid coverage on the entire dome 204, resulting in improved cleaning efficiency. The particular angle α may depend upon the size of the dome 204 and the pressure of the fluid exiting the nozzle 212, for example.

Although the nozzles 212 are shown as substantially stationary with respect to the radiometer 200, it should be appreciated that in other embodiments, the nozzles 212 may be movable with respect to the shield 203. For example, the nozzles 212 could lift away from the shield 203 during use and return to their original position once the cleaning operation is completed. The movement could be accomplished using a motor or fluid pressure. For example, the nozzles 212 could include a biasing member (not shown), such as a spring that could bias the nozzles 212 into the position shown and once a fluidized pressure source were provided, the pressurized fluid could overcome the force of the biasing member to raise the nozzles 212 to a predetermined position.

FIG. 3 shows a schematic of the cleaning system 210 adapted to clean the radiometer 200 according to an embodiment of the invention. It should be appreciated that the various components of the cleaning system 210 in FIG. 3 are not shown to scale. According to the embodiment shown in FIG. 3, the cleaning system 210 comprises one or more nozzles 212, one or more fluid conduits 213, a nozzle coupling member 314, a pressurized fluid source 316, and a fluid control valve 315.

According to an embodiment of the invention, the coupling member 314 can be provided to couple the one or more nozzles 212 to the radiometer 200. The coupling member 314 is shown as comprising a coupling ring; however, the coupling member 314 could comprise any shape and should not be limited to a ring. The coupling member 314 is shown removed from the radiometer 200; however, it can easily be appreciated that in the embodiment shown, the coupling member 314 is adapted to fit around the body 201 and beneath the radiation shield 203. The one or more nozzles 212 may be coupled to the coupling member 314 in a variety of manners, including, but not limited to adhesives, brazing, bonding, or mechanical fasteners. According to an embodiment of the invention, the coupling member 314 may include a plurality of apertures 317, with each aperture 317 being adapted to receive a nozzle 212. The apertures 317 may be formed at various angles so that when the nozzle 212 is received in the aperture 317, the nozzle 212 will be rotated by an angle α. By providing the apertures 317 at an angle, if more than one nozzle 212 is provided, it can be ensured that the nozzles 212 are positioned at substantially the same angle, if desired. Alternatively, it may be desirable to include various nozzles 212 positioned at different angles.

As mentioned above, the coupling member 314 may be provided in some embodiments to couple the nozzles 212 to the radiometer 200. In the embodiment shown, the coupling member 314 is adapted to couple the one or more nozzles 212 to the shield 203. According to an embodiment of the invention, the coupling member 314 may be sized to fit underneath the shield 203 with the nozzles 212 extending from the bottom of the shield 203 through openings 319 formed in the shield 203. The coupling member 314 therefore, can not only be provided to adjust the angle of the nozzles 212, but can also adjust the height that the nozzles 212 extend above the shield 203. Advantageously, when the coupling member 314 is used, the nozzles 212 are not connected directly to the shield 203. This allows the entire cleaning system 210 to be easily removed from the radiometer 200. The coupling member 314 may be coupled to the radiometer 200 in a variety of manners, including, but not limited to adhesives, brazing, bonding, or mechanical fasteners, such as bolts or screws. In the embodiment shown in FIG. 3, the coupling member 314 includes a plurality of openings 318 that are adapted to accept a mechanical fastener that can also be received by the shield 203, for example. In this embodiment, spacers (not shown) may be provided to adjust the distance between the coupling member 314 and the shield 203, i.e., to adjust the amount the nozzles 212 extend from the shield 203. It should be appreciated that in other embodiments, the coupling member 314 may be coupled to the top of the shield 203 rather than the bottom. In yet a further embodiment, the coupling member 314 could be coupled to another portion of the radiometer 200, such as the body 201, for example.

As shown, the nozzles 212 can extend through the apertures 317 formed in the coupling member 314 allowing the fluid conduits 213 to be coupled to the nozzles 212. Although only three nozzles 212 are shown in the present embodiment, it should be appreciated that any number of nozzles 212 may be provided and the particular number of nozzles 212 implemented should not limit the scope of the present invention. In some embodiments, one or more nozzles 212 may be provided to clean the dome 204 and one or more additional nozzles 212 may be provided to clean another portion of the radiometer 200, such as the shield 203, for example. The portion of the radiometer 200 cleaned can be determined based on the angle and height of the nozzles 212, as well as the pressure at which the fluid exits the nozzles 212. In many embodiments, the shield 203 will be cleaned even if the nozzles 212 are directed at the dome 204 by the fluid running down the dome 204 and onto the shield 203.

Coupled to the end of the fluid conduits 213 opposite the nozzles 212 is a control valve 315. The control valve 315 can selectively deliver a fluid from a pressurized fluid source 316. The control valve 315 may comprise a fluid actuated valve, a manually actuated valve, or an electrically actuated valve, such as a solenoid valve, for example. The particular valve 315 chosen should not limit the scope of the present invention. However, if the radiometer 200 is to be used in extreme environments, such as the Arctic, it may be desirable to select a control valve 315 that can withstand the cold temperatures. The selection of the control valve 315 may also depend upon the particular fluid used as a cleaning fluid. For example, the valve seals may swell when used with certain fluids, particularly de-icers, such as methanol, for example. Therefore, as can be appreciated, the particular valve chosen may depend upon the anticipated operating conditions.

The pressurized fluid source 316 may be pressurized by a pressurized cylinder or similar pressurized device. According to an embodiment of the invention, the pressurized fluid source 316 is sized such that its length, L, is greater than its height, H. This may be desired in certain situations due to the structure on which the radiometer 200 is mounted, for example. The particular size of the fluid source 316 may vary, however, in many circumstances it will be desirable to maximize the operating duration of the cleaning system 210. Therefore, a larger fluid source 316 may be wanted in some circumstances. This would allow a greater amount of time between re-filling of the fluid source 316. As mentioned above, FIG. 3 is not to scale and therefore, in many embodiments, the pressurized fluid source 316 may be much larger than the radiometer 200. According to an embodiment of the invention, the cleaning fluid stored in the pressurized fluid source 316 may comprise an alcohol-based fluid, such as methanol. Although ethanol may be used, experimental trials have shown that ethanol is less desirable because after being sprayed onto the dome 204, it often leaves a residue behind, thereby not completely cleaning the dome 204. In contrast, testing showed that methanol does not leave a residue on the dome 205 after evaporating. Furthermore, methanol has a relatively low melting point of approximately −97° C. (−142.9° F.). Advantageously, methanol can be used as the fluid and/or de-icer in extremely cold environments in order to remove rime ice from the dome 205 where other fluids, such as water would easily freeze. Other fluids may be used as the cleaning fluid and/or de-icer and the present invention should not be limited to methanol.

Advantageously, with the cleaning system 210 provided, the dome 204 can be kept clean from dirt, debris, and rime along with other foreign matter. Therefore, the performance of the radiometer 200 can be greatly improved as opposed to prior art systems that required manual cleaning that typically only took place once a day and more likely, once a week.

In use, the one or more nozzles 212 may be coupled directly to the radiation shield 203 at a desired angle and extend above the shield 203 a desired height. Alternatively, the cleaning system 210 may include the coupling member 314. Therefore, the one or more nozzles 212 can be coupled to the coupling member 314 in advance with the nozzles 212 received in the apertures 317 having the desired angles. The coupling member 314 can then be coupled to the radiometer 200 with the one or more nozzles 212 extending from the top of the radiation shield 203 a desired height. Preferably, the height that the nozzles 212 extend from the radiation shield 203 is below the plane of view 220 of the sensor 205.

Once the cleaning system 210 is coupled to the radiometer 200, the dome 204 or any other desired surface of the radiometer 200 may be cleaned by applying a fluid from the one or more nozzles 212. If the fluid comprises a de-icer, such as methanol, then cleaning the desired surface of the radiometer 200 may also comprise de-icing the desired surface. Therefore, when it is desired to clean the dome 204, for example, the fluid control valve 315 can be actuated, thereby supplying the fluid to the fluid conduits 213 and thus, to the nozzles 212 for a pre-determined amount of time. The pressure at which the fluid is supplied may vary based on the desired flow. However, experimental tests have shown that a fluid pressure at the nozzle between 3-10 psi, and more preferably, approximately 5 psi provides adequate cleaning while minimizing the amount of fluid used to clean the dome 204. It should be appreciated that these pressures may vary depending upon the particular application and the amount of cleaning required. According to an embodiment of the invention, the fluid pressure is chosen such that a laminar flow is produced on the dome 204 as the fluid runs down the dome 204 due to gravity. Furthermore, during cleaning the duration of spray may vary. For example, longer spray durations may be required to clear the dome 204 of rime than to clear the dome 204 of dirt, for example. A three-second duration spray with a nozzle pressure of approximately 5 psi has demonstrated adequate cleaning capabilities of rime on the dome 204. However, this duration could vary based on a number of factors and therefore, the particular spray duration should not limit the scope of the present invention.

The radiometer 200 may be cleaned according to a pre-determined time interval. For example, the radiometer 200 may be cleaned once or twice per day. Alternatively, the radiometer 200 may be cleaned by manually actuating the control valve 315 if dirt or rime is detected. The duration of a cleaning cycle may be pre-determined based on a duration time or a calculated amount of fluid.

The present invention, as described above, provides a radiometer 200 that includes one or more fluid nozzles 212. The one or more fluid nozzles 212 may be adapted to apply a fluid onto the radiation transparent dome 204 of the radiometer 200. The one or more fluid nozzles 212 may be supplied with a fluid from a pressurized fluid source 316 via fluid conduits 213. The pressurized fluid source 316 may include a de-icing cleaning fluid, such that when applied onto the dome 204 by the nozzles 212, the cleaning fluid can melt away rime ice, frost, snow, etc. from the surface of the dome 204. Advantageously, the dome 204 can be kept substantially free of foreign material that may interfere with the radiometer's measuring capabilities. Unlike prior art attempts that required manual cleaning or expensive heaters and/or fans, the present invention operates using a relatively little amount of power and does not require the radiometer 200 to be located at a manned site in order to properly operate. Therefore, the radiometer 200 of the present invention is capable of operating cheaper than radiometers of the prior art and can be located in remote locations.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other weather instruments, and not just to the embodiments described above and shown in the accompanying figures. Accordingly, the scope of the invention should be determined from the following claims.

We claim:

1. A radiometer, comprising:
   a sensor;
   a radiation transparent dome surrounding the sensor; and
   one or more fluid nozzles adapted to apply a fluid on the radiation transparent dome while being positioned out of a plane of view of the sensor.

2. The radiometer of claim 1, further comprising a radiation shield, wherein the one or more fluid nozzles are coupled to the radiation shield.

3. The radiometer of claim 2, further comprising one or more openings formed in the radiation shield and adapted to receive the one or more fluid nozzles.

4. The radiometer of claim 1, further comprising a coupling member including one or more apertures sized to receive the one or more fluid nozzles, the coupling member being coupled to a radiation shield.

5. The radiometer of claim 1, further comprising one or more fluid conduits coupled to the one or more fluid nozzles and a fluid control valve coupled to the one or more fluid conduits and adapted to selectively control a fluid flow from a pressurized fluid source to the one or more fluid conduits.

6. The radiometer of claim 1, wherein the fluid comprises a liquid de-icer.

7. The radiometer of claim 1, wherein the fluid comprises methanol.

8. The radiometer of claim 1, wherein the one or more nozzles are angled with respect to the plane of view.

9. A cleaning system for a radiometer, comprising:
   one or more fluid nozzles adapted to apply a fluid on a radiation transparent dome of the radiometer;
   one or more fluid conduits coupled to the one or more nozzles and adapted to provide fluid communication between the one or more nozzles and a pressurized fluid source; and a coupling member including one or more apertures sized to receive the one or more nozzles and adapted to be coupled to a portion of the radiometer, such that the one or more fluid nozzles are positioned out of a plane of view of the sensor.

10. The cleaning system of claim 9, further comprising a fluid control valve coupled to the one or more fluid conduits and adapted to selectively control a fluid flow from the pressurized fluid source to the one or more fluid conduits.

11. The cleaning system of claim 9, wherein the fluid comprises a liquid de-icer.

12. The cleaning system of claim 9, wherein the fluid comprises methanol.

13. A method for cleaning a radiometer including a sensor and a radiation transparent dome surrounding the sensor, comprising a step of:

providing the radiation transparent dome with a fluid using one or more fluid nozzles coupled to the radiometer such that the one or more fluid nozzles are positioned out of a plane of view of the sensor.

14. The method of claim 13, wherein the step of providing the radiation transparent dome with a fluid comprises actuating a fluid control valve to open a fluid flow path between a pressurized fluid source and the one or more nozzles.

15. The method of claim 13, wherein the step of providing the radiation transparent dome comprises applying the fluid for a predetermined amount of time.

16. The method of claim 13, wherein the fluid comprises a liquid de-icer.

17. The method of claim 13, wherein the fluid comprises methanol.

* * * * *